Aug. 13, 1935.  F. MOHLER  2,011,371
CONTROL SYSTEM
Filed Oct. 11, 1933
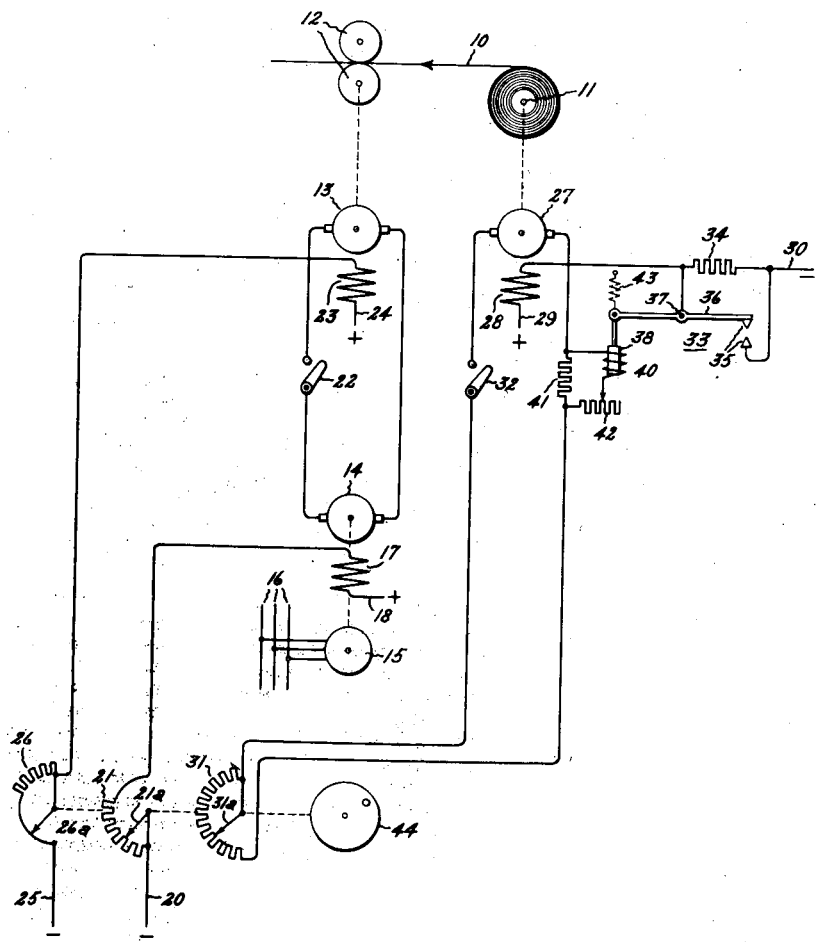
Inventor:
Francis Mohler,
by Harry E. Dunham
His Attorney.

Patented Aug. 13, 1935

2,011,371

UNITED STATES PATENT OFFICE 2,011,371

CONTROL SYSTEM

Francis Mehler, Schenectady, N. Y., assignor to General Electric Company, a corporation of New York

Application October 11, 1933, Serial No. 693,139

5 Claims. (Cl. 80—32)

This invention relates to control systems, more particularly to systems for controlling the operation of apparatus in which a strip of material is supplied from a reel to an operating element, such as a pair of mill rolls, and it has for an object the provision of a simple, reliable and improved system of this character.

More specifically, the invention relates to control systems for variable speed apparatus operating upon a strip of material and a further object of the invention is the provision of means for maintaining substantially constant tension in the strip between the supply reel and the operating element irrespective of the strip speed.

In carrying the invention into effect in one form thereof, an operating element unwinds a strip of material from a supply reel from which is driven a dynamo-electric machine supplying current to a dynamic braking resistance, and means are provided for varying the dynamic braking resistance in accordance with the speed of the strip.

The invention is illustrated in one form thereof as applied to a cold strip steel rolling mill in which the strip is unwound from a reel and passed through rolls for reducing its gage. For a better and more complete understanding of the invention reference should now be had to the following specification and to the accompanying drawing, the single figure of which is a simple diagrammatical representation of an embodiment of the invention.

Referring now to the drawing, a strip of material 10 such for example as cold rolled steel is being unwound from the supply reel 11 by means of mill rolls 12 through which the strip passes in the direction of the arrow. In passing through the rolls 12 the gage of the strip 10 is reduced by a predetermined amount and the strip emerging from the mill rolls may be either passed to a succeeding set of mill rolls or in the case of a single stand reversing mill, the strip is wound upon a suitable take-up reel.

The mill rolls 12 are driven by any suitable driving means shown for the purposes of illustration as a direct current motor 13 of the adjustable speed type, the armature of which is supplied with current from a suitable supply source illustrated as a variable voltage generator 14. As shown, the generator 14 is driven at a speed, which is preferably substantially constant, by any suitable driving means such for example as that represented by the alternating current motor 15 which in turn is supplied from a suitable source of alternating current represented in the drawing by the three supply lines 16 to which the terminals of the motor 15 are connected as illustrated. The generator 14 is provided with a field winding 17 which is supplied with direct current from a suitable source such for example as that represented by the two supply lines 18, 20 to which the terminals of the field windings 17 are connected with the variable resistance 21 included in the circuit. Suitable switching means illustrated as a manually operated switch 22 is provided for completing a loop circuit between the armature of the generator 14 and the armature of the mill motor 13. This connection is known in the art as a Ward Leonard connection and it has the advantage that the speed of the motor 13 can be varied over a wide range of speed by varying the rheostat 21 in the field of the generator to vary its voltage. By means of this Ward Leonard connection the speed of the mill driving motor 13 may be varied over a range as great as 10-1.

The mill motor 13 is provided with the direct current field winding 23 supplied from a suitable source of direct current such as that represented in the drawing by the supply line 24, 25 to which the field winding is connected with a variable resistance 26 included in the circuit. The supply lines 24, 25 may be and preferably are the same as the supply lines 18, 20 to which the field winding 17 of the supply generator is connected.

In the art of rolling cold strip steel as well as in many other allied arts, it is important to maintain a substantially constant tension in the strip between the unwinding reel and the mill rolls. For this purpose there is provided a dynamo electric machine 27, the drive shaft of which is connected either directly or through suitable reduction gearing to the roll 11 so that the dynamo electric machine is driven at a speed such that its generated voltage is proportional to the speed of the reel. This dynamo-electric machine is provided with a direct current field winding 28 which is supplied from a suitable source of direct current represented by the supply lines 29, 30 which may be and preferably are the same as the supply lines 18, 20 to which the field of the generator 14 is connected. As shown, the armature member of the dynamo-electric machine 27 is connected in circuit with a dynamic braking resistance 31 and suitable switching means illustrated as a manually operated switch 32 are provided for completing and interrupting this dynamic braking circuit. Since the armature of the dynamo electric machine 27 is driven by the reel 11 as the strip is unwound therefrom, current is supplied to the dynamic braking resistance 31 and dissipated in the form of heat.

Preferably the strip 10 is unwound from the reel 11 at a substantially constant peripheral speed. As the diameter of the strip roll decreases, the speed of rotation of the reel 11 and the dynamo-electric machine 27 increases proportionately. Consequently if the field excitation of the dynamo-electric machine 27 remains constant the current supplied to the dynamic braking resistance 31 would increase in proportion to the increase in speed of rotation of the dynamo-electric machine and this increase in current would result in the increase in tension in the strip 10 between the reel 11 and the rolls 12. However, variation in the tension of the strip is extremely undesirable and for this reason means 33 are provided for maintaining the current supplied to the dynamic braking resistance 31 substantially constant. The means 33 are illustrated as comprising a constant current regulator of any well-known commercial type. Briefly this regulator comprises a resistance 34 included in the circuit with the field winding 28 of the dynamo electric machine 27 and a pair of vibratory contacts 35 for rapidly opening and closing a short circuit about the resistance 34. The lower contact 35 is stationary whilst the upper contact is mounted on a lever 36, which as shown, is arranged for limited rotation about a pivot point 37. To the opposite end of the lever 37 is secured the core 38 which is arranged within the turns of a solenoid 40 so as to be attracted in a downwardly direction in response to a predetermined energization of the solenoid. As shown, a resistance 41 is included in circuit between the armature of the dynamo-electric machine 27 and the dynamic braking resistance 31 and the terminals of the solenoid 40 are connected across the resistance 41 so that the energization of the solenoid 40 is proportional to the current flowing in the dynamic braking circuit. A variable resistance 42 is included in the circuit of the operating coil 40 for the purpose of changing the setting of the regulator. One end of a spring 43 is secured to the end of the lever 36 so that its pull is balanced against the pull of the operating coil 40. When the contacts 35 are open the full amount of the resistance 34 is in circuit with the field winding 28 thus weakening the excitation of the dynamo-electric machine 36 and decreasing its generated voltage as well as the current supplied to the dynamic braking resistance 31. A decrease in current weakens the excitation of the operating coil 40 thus allowing the spring 43 to close the contacts 35 and short circuit the resistance 34. As a result, by short circuiting the resistance 34 the excitation of the field 28 is increased thereby increasing the voltage and current flowing in the dynamic braking circuit. This increase in current strengthens the excitation of the operating coil 40 so that its pull overpowers the pull of the spring 43 and opens the contacts 35 thereby removing the short circuit from about the resistance 34. This operation is repeated at such a rapid rate that the variations in the current in the dynamic braking circuit are extremely minute and the current flowing in this circuit is maintained substantially constant at a value dependent upon the ratio of the total time the contacts 35 are open to the total time that the contacts are closed.

The energy expended in unwinding the strip 10 from the reel 11 is proportional to the speed of the strip and the energy input to the reel 11 must, except for the losses in the dynamo electric machine 27, be dissipated in the form of heat in the dynamic braking resistance 31. It will be seen that if the speed of the strip 10 is varied, the energy input to the reel 11 also varies. However, the regulator 33 maintains the current in the dynamic braking circuit substantially constant and consequently, if the dynamic braking resistance 31 remains constant for varying speeds of the strip 10, the tension of the strip 10 would have to vary. This is more clearly seen from the following equations:

(1) H. P. input to reel = H. P. output of dynamo-electric machine 27.

The above equation may be rewritten in the following form:

(2) $\dfrac{TXS}{33000} = KI^2R$ in which:

T = the tension in the strip 10.
S = speed of the strip 10 in feet per minute.
I = current supplied to dynamic braking resistance.
R = ohmic resistance of dynamic braking resistance 31.
K = a constant.

From an inspection of Equation (2) it is readily seen that if the speed of the strip varies and the current flowing in the dynamic circuit is maintained constant by the regulator 33 that the value of the dynamic braking resistance will have to vary in proportion to the speed of the strip if the tension is to be maintained constant as desired. For this purpose, the movable contact arm $31_a$ of the dynamic braking resistance 31 is mechanically connected by means of a shaft or other suitable connection to the movable contact members $21_a$ and $26_a$ of the resistances 21 and 26 and is schematically indicated in the drawing. Suitable means illustrated as a manually operated hand-wheel 44 are provided on the shaft of the movable contact members $21_a$, $26_a$ and $31_a$ so that when the hand-wheel is operated to adjust the speed of the mill, the ohmic value of the dynamic braking resistance 31 is varied in accordance with the speed of the strip.

When the movable contact arm $26_a$ is in its lowermost position, the resistance 26 is short circuited so that the excitation of the field 23 of the mill motor is maximum. With the contact arm $21_a$ in its lowermost position the full amount of the resistance 21 is in circuit with the field winding 17 of the supply generator 14 so that the field excitation of the generator and the generated voltage thereof are minimum. In the lowermost position of the contact arm $31_a$ the resistance 31 is completely short circuited.

It will be observed that as the hand-wheel 44 is rotated in a clockwise direction to adjust the speed of the mill motor 13 to any desired value, the field of the generator 14 is first strengthened by gradually short-circuiting the resistance 21 and when full voltage is obtained at the terminals of the generator 14, the field of the mill motor 13 is weakened by gradually inserting the resistance 26 in the field circuit thereof.

In operation, the hand-wheel 44 is adjusted to a position such that the speed of the mill motor is at a desired value corresponding to that position of the hand-wheel. Assuming that the hand-wheel 44 is turned in a clockwise direction to increase the speed of the mill and the strip 10, the energy input to the reel 11 will of course, increase if the tension remains constant. Since rotation of the hand-wheel 44 in a clockwise direction to increase the speed of the mill motor 13 and the strip 10 also rotates the movable contact member 31a in a direction to increase the amount of the dynamic braking resistance 31 in the dynamic braking circuit, the energy output of the dynamo-electric machine 27 will increase in proportion due to the fact that the constant current regulator 33 maintains the current constant. Consequently, since the dynamic braking resistance 31 is varied in proportion to the speed of the strip and since the current of the dynamic braking circuit is always maintained constant by the constant current regulator 33 the tension of the strip 10 between the supply reel 11 and the rolls 12 will maintain constant at all strip speeds. This constant tension will be maintained by the unwinding reel at all times.

Although in accordance with the provisions of the patent statutes, the invention is described as embodied in concrete form, it will be understood that the apparatus and connections shown in the drawing and described in the specification are merely illustrative and are not limited thereto since alterations and modifications will readily suggest themselves to persons skilled in the art without departing from the true spirit of this invention or from the scope of the annexed claims.

What I claim as new and desire to secure by Letters Patent of the United States is:

1. In combination with an element operating on a strip of material, means for supplying strip to said element, means for driving said element, a dynamo-electric machine connected to said supply means, a dynamic braking resistance connected in circuit with said dynamo-electric machine, speed varying means for said driving means, and means for varying said braking resistance in accordance with the speed of said driving means.

2. In combination with a pair of mill rolls operating on a strip of material, a reel for supplying strip to said rolls, means for driving said rolls, means for maintaining tension in said strip comprising a dynamo-electric machine connected to said reel and a dynamic braking resistance in circuit with said dynamo electric machine, speed varying means for said driving means, and means for varying said dynamic braking resistance in accordance with operation of said speed varying means.

3. A motor control system for rolling mills operating on a strip of material comprising an electric motor for driving the mill rolls, a reel for supplying strip to said rolls, means for maintaining said strip under tension comprising a dynamo-electric machine connected to said reel and a dynamic braking resistance in circuit with said dynamo-electric machine, a variable resistance in circuit with said motor for varying the speed thereof, and a connection between said variable resistance and said dynamic braking resistance providing variation of said dynamic braking resistance in accordance with variations in the speed of said strip.

4. A motor control system for rolling mills operating on a strip of material comprising an electric motor for driving said rolls, a reel for supplying strip to said rolls, means for maintaining tension in said strip comprising a dynamo electric machine connected to said reel and a dynamic braking resistance connected in circuit with said dynamo-electric machine, a regulating device connected to said dynamo-electric machine for maintaining said tension constant for a predetermined speed of the strip, a rheostat for varying the speed of said motor to vary the speed of said strip, and a mechanical connection between said rheostat and said dynamic braking resistance providing variation of said dynamic braking resistance with variation in the speed of the strip to maintain said tension constant at all speeds of said strip.

5. A control system for rolling mills and the like comprising an electric motor for driving the mill rolls, a reel for supplying strip to the rolls, tension maintaining means for said strip comprising a dynamo-electric machine having a dynamic braking resistance connected in its armature circuit and mechanically connected to said reel to exert a braking torque, a constant current regulator connected to said dynamo-electric machine for maintaining the strip tension constant at any predetermined strip speed, a generator for supplying said mill motor, rheostats in the field circuits of said motor and generator for varying the speed of the strip and a connection between said rheostats and said dynamic braking resistance providing variation of said dynamic braking resistance in accordance with the strip speed to maintain constant horsepower output and substantially constant strip tension irrespective of the speed of the strip.

FRANCIS MOHLER.